(No Model.)

F. E. BOSS.
VEHICLE AXLE NUT.

No. 530,387. Patented Dec. 4, 1894.

WITNESSES:
William J. Miller
Chas. E. Poenzgen

INVENTOR:
Fred E. Boss
BY
Hauff & Hauff
ATTORNEYS.

UNITED STATES PATENT OFFICE.

FRED E. BOSS, OF NEW YORK, N. Y., ASSIGNOR TO ELLA MAY BOSS, OF SAME PLACE.

VEHICLE-AXLE NUT.

SPECIFICATION forming part of Letters Patent No. 530,387, dated December 4, 1894.

Application filed March 8, 1894. Serial No. 502,840. (No model.)

*To all whom it may concern:*

Be it known that I, FRED E. BOSS, a citizen of the United States, residing at New York, in the county and State of New York, have invented new and useful Improvements in Vehicle-Axles, of which the following is a specification.

This invention has for its object to provide new and improved means for retaining the wheels of vehicles on the spindles of the axles; and to this end the invention consists in the features of construction and the combination of devices hereinafter described and claimed, reference being made to the accompanying drawings, in which—

Figure 1:
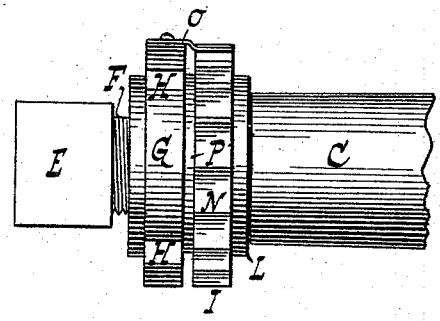
Figure 2:
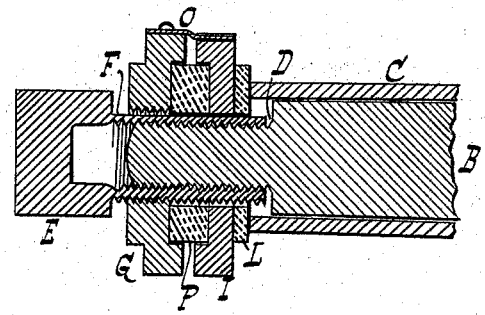
Figure 3:
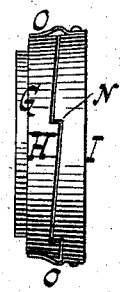

Figure 1 is a side elevation of the outer end portion of an axle provided with my invention. Fig. 2 is a sectional view of the same; and Fig. 3 is a detail elevation, showing a modification.

In order to enable those skilled in the art to make and use my invention, I will now describe the same in detail, referring to the drawings, wherein—

The letter B indicates the outer end portion of the wheel-spindle of an axle, having a longitudinally extending screw-threaded stem D, on which is mounted a nut E provided with a tubular shank F, which is internally and externally screw-threaded. The internal screw threads engage the stem D, and the external screw threads are designed to engage the threads of a disk G which can be adjusted along the length of the shank by rotating the disk thereupon. The tubular shank F also carries a disk I which is adjustable along the length of the shank, but is held against rotation thereupon. To accomplish this, the shank F is provided with a flattened unthreaded portion, clearly shown in Fig. 2, which engages a flattened portion of the orifice through the non-rotary disk, in such manner that while the disk is susceptible of moving along the shank, it is incapable of rotating thereupon.

The rotary-disk G and non-rotary disk I are provided with cavities to receive a washer P which is interposed between the disks and prevents rattling of the disks. The periphery of the non-rotary disk I is provided with a series of teeth N, and to the periphery of the rotary disk G is secured one end of a spring O, the opposite end of which engages any one of the teeth N, whereby the rotary disk is held against rotation unless it is intentionally turned to cause the free end of the spring O to ride out of one of the teeth and engage an adjacent tooth.

In Figs. 1 and 2 the spring O is secured to and rotates with the rotary-disk G, but in Fig. 3 the spring O is rigidly secured to the non-rotary disk I, and its free extremity bears against the periphery of the rotary disk G.

In Fig. 3 the adjacent faces of the disks are provided with beveled or inclined edges N' adapted to interlock and aid in preventing the rotary disk from accidentally turning. The springs O not only hold the rotary disk against accidental rotation, but also, in a large measure, prevent rattling of the disks.

Having thus described my invention, what I claim is—

1. The combination with an axle-spindle having a screw-threaded stem, and a nut having a tubular shank provided with internal and external screw-threads, of a rotary and a non-rotary disk both mounted on the tubular shank, and a spring rigidly secured to one of the disks and engaged at its free extremity with the periphery of the other disk, substantially as described.

2. The combination with an axle-spindle, of a nut secured to the spindle, a rotary disk on the nut, and a non-rotary disk for locking the rotary disk, said disks having beveled or inclined interlocking edges, and one of said disks having an attached spring, the free end of which engages the periphery of the other disk, substantially as described.

In testimony whereof I have hereunto set my hand in the presence of two subscribing witnesses.

FRED E. BOSS.

Witnesses:
WM. C. HAUFF,
E. F. KASTENHUBER.